United States Patent
Liang et al.

(10) Patent No.: US 11,253,418 B2
(45) Date of Patent: Feb. 22, 2022

(54) WALKER AND OMNIDIRECTIONAL WHEEL THEREOF

(71) Applicant: Wistron Corp., New Taipei (TW)

(72) Inventors: Chen Yi Liang, New Taipei (TW);
Cheng Hsing Liu, New Taipei (TW);
Chien-Wei Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 35 days.

(21) Appl. No.: 16/849,929

(22) Filed: Apr. 15, 2020

(65) Prior Publication Data

US 2021/0154085 A1 May 27, 2021

(30) Foreign Application Priority Data

Nov. 21, 2019 (TW) ................................ 108142229

(51) Int. Cl.
*A61H 3/04* (2006.01)
(52) U.S. Cl.
CPC ...................................... *A61H 3/04* (2013.01)
(58) Field of Classification Search
CPC ........................................................ A61H 3/04
See application file for complete search history.

(56) References Cited

U.S. PATENT DOCUMENTS

| | | | | |
|---|---|---|---|---|
| 7,730,978 B2* | 6/2010 | Dixon | ................... | B62D 15/00 180/7.1 |
| 9,004,202 B2* | 4/2015 | Riwan | ................... | B60B 33/08 180/7.1 |
| 9,440,356 B2* | 9/2016 | Sutherland | ............... | B25J 5/007 |
| 2009/0194142 A1* | 8/2009 | Zimmerman | ............. | A61H 3/04 135/67 |
| 2010/0140893 A1* | 6/2010 | Menefee | .................. | A61H 3/04 280/87.041 |
| 2011/0146736 A1* | 6/2011 | Pfafflin | ............... | B60B 33/0039 135/67 |
| 2014/0091543 A1* | 4/2014 | Menard | .................... | A61H 3/04 280/87.021 |
| 2015/0076797 A1* | 3/2015 | Alink | ......................... | B62J 1/10 280/647 |
| 2015/0129340 A1* | 5/2015 | Maisonnier | ............ | B62D 61/06 180/210 |
| 2017/0008544 A1* | 1/2017 | Kindberg | .................. | A61H 3/04 |
| 2017/0143575 A1* | 5/2017 | Heinrich | .................. | A61H 3/00 |
| 2017/0165146 A1* | 6/2017 | Franson | ................... | B62K 5/08 |
| 2017/0252602 A1* | 9/2017 | Lefkovitz | .......... | A63B 21/4039 |
| 2018/0194165 A1* | 7/2018 | Min | ...................... | B60B 19/003 |

(Continued)

FOREIGN PATENT DOCUMENTS

| | | |
|---|---|---|
| CN | 104097706 A | 10/2014 |
| JP | 2012-143488 A | 8/2012 |
| JP | 2016-215713 A | 12/2016 |

*Primary Examiner* — Erez Gurari

(57) ABSTRACT

An omnidirectional wheel is provided. The omnidirectional wheel includes a support unit, a major wheel, a first minor wheel and a second minor wheel. The major wheel is annular and is rotatably disposed on the support unit. The first minor wheel is rotatably disposed on the support unit. The first minor wheel is disposed on one side of the major wheel. The second minor wheel is rotatably disposed on the support unit. The second minor wheel is disposed on the other side of the major wheel. The omnidirectional wheel can easily roll over an obstacle when the omnidirectional wheel rolls laterally or forward.

19 Claims, 13 Drawing Sheets

(56) References Cited

U.S. PATENT DOCUMENTS

| | | | |
|---|---|---|---|
| 2019/0224058 A1* | 7/2019 | Liang | A61G 5/1089 |
| 2019/0240106 A1* | 8/2019 | Kapec | A61H 3/04 |
| 2019/0247697 A1* | 8/2019 | Park | A63B 21/4009 |
| 2020/0406675 A1* | 12/2020 | Yang | B60B 19/003 |
| 2021/0154085 A1* | 5/2021 | Liang | A61H 1/00 |

* cited by examiner

WALKER AND OMNIDIRECTIONAL WHEEL THEREOF

CROSS REFERENCE TO RELATED APPLICATIONS

This application claims priority of Taiwan Patent Application No. 108142229, filed on Nov. 21, 2019, the entirety of which is incorporated by reference herein.

BACKGROUND OF THE INVENTION

Field of the Invention

The present invention relates to an omnidirectional wheel, and in particular to an omnidirectional wheel which is adapted to roll in a sideways direction.

Description of the Related Art

There are two types of conventional omnidirectional wheels: major wheels and minor wheels. Minor wheels are disposed around a major wheel, which allow the omnidirectional wheel to roll in the sideways direction (to roll laterally). Since the diameter of a minor wheel is far less than the diameter of a major wheel. The omnidirectional wheel can only roll over an obstacle when the omnidirectional wheel rolls forward. When the omnidirectional wheel rolls laterally, the omnidirectional wheel cannot roll over an obstacle smoothly. Therefore, the conventional omnidirectional wheel is not suitable for rolling on bumpy roads.

BRIEF SUMMARY OF THE INVENTION

Embodiments of the inventions are provided to solve the difficulty mentioned above.

In one embodiment, an omnidirectional wheel is provided. The omnidirectional wheel includes a support unit, a major wheel, a first minor wheel and a second minor wheel. The major wheel is annular and is rotatably disposed on the support unit. The first minor wheel is rotatably disposed on the support unit. The first minor wheel is disposed on one side of the major wheel. The second minor wheel is rotatably disposed on the support unit. The second minor wheel is disposed on the other side of the major wheel.

In one embodiment, the first minor wheel and the second minor wheel are ellipsoid-shaped.

In one embodiment, the support unit comprises a supporting base plate. The first minor wheel comprises a first shaft, a first minor wheel section and a second minor wheel section. The first minor wheel section and the second minor wheel section are rotatably disposed on two sides of the supporting base plate via the first shaft.

In one embodiment, the first minor wheel comprises a minor wheel tread, and the minor wheel tread extends in a spiral path around the first shaft.

In one embodiment, the supporting base plate is on a first plane. There is a second plane that is orthogonal to the first plane. The axis of the first shaft extends to the second plane. On the second plane, cross sections of the major wheel, the first minor wheel, and the second minor wheel form a circular profile.

In one embodiment, the major wheel comprises a hub, a tire layer, a bearing, and an annular restriction plate. The tire layer surrounds the hub. The annular restriction plate is affixed to the hub, and the bearing is sandwiched between the annular restriction plate and the hub.

In one embodiment, the support unit comprises a bearing bracket. The bearing is telescoped on the bearing bracket, and the bearing bracket is wedged into the supporting base plate.

In one embodiment, the support unit further comprises a plurality of auxiliary restriction plates. The auxiliary restriction plates are affixed to the bearing bracket. The auxiliary restriction plates restrict the bearing.

In one embodiment, the omnidirectional wheel further comprises a rotational bracket. The rotational bracket comprises a first arm, a second arm and a connection shaft. The first arm is affixed to the second arm. The first arm and the second arm are rotatably connected to the connection shaft. The supporting base plate is affixed to the first arm and the second arm.

In one embodiment, the first arm comprises a first notch. The second arm comprises a second notch. The hub and the tire layer are located in the first notch and the second notch.

In one embodiment, the first arm covers at least a portion of the bearing.

In one embodiment, a walker is provided. The walker includes a walker body, a front wheel and an omnidirectional wheel. The front wheel is rotatably connected to a front part of the walker body. The omnidirectional wheel is rotatably connected to a rear part of the walker body. The omnidirectional wheel comprises a support unit, a major wheel, a first minor wheel and a second minor wheel. The major wheel is annular and is rotatably disposed on the support unit. The first minor wheel is rotatably disposed on the support unit. The first minor wheel is disposed on one side of the major wheel. The second minor wheel is rotatably disposed on the support unit. The second minor wheel is disposed on the other side of the major wheel.

In one embodiment, the walker further comprises a connection cylinder and a connection bracket. The connection bracket is affixed to the connection cylinder. The connection bracket is connected to the walker body, and the connection shaft is connected to the connection cylinder.

In the omnidirectional wheel of the embodiment of the invention, the first minor wheel and the second minor wheel are disposed on two sides of the major wheel, and the first minor wheel and the second minor wheel are ellipsoid-shaped. Therefore, when the omnidirectional wheel rolls laterally, the profile (contacting the ground) formed by cross sections of the major wheel, the first minor wheel and the second minor wheel is circular, or substantially circular. The omnidirectional wheel therefore can roll smoothly. In the embodiment of the invention, the rotational diameter of the omnidirectional wheel in lateral rolling is substantially the same with the rotational diameter of the omnidirectional wheel in forward rolling. In other words, the omnidirectional wheel W1 can easily roll over an obstacle when the omnidirectional wheel W1 rolls laterally or forward, which is adapted to roll on bumpy roads.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
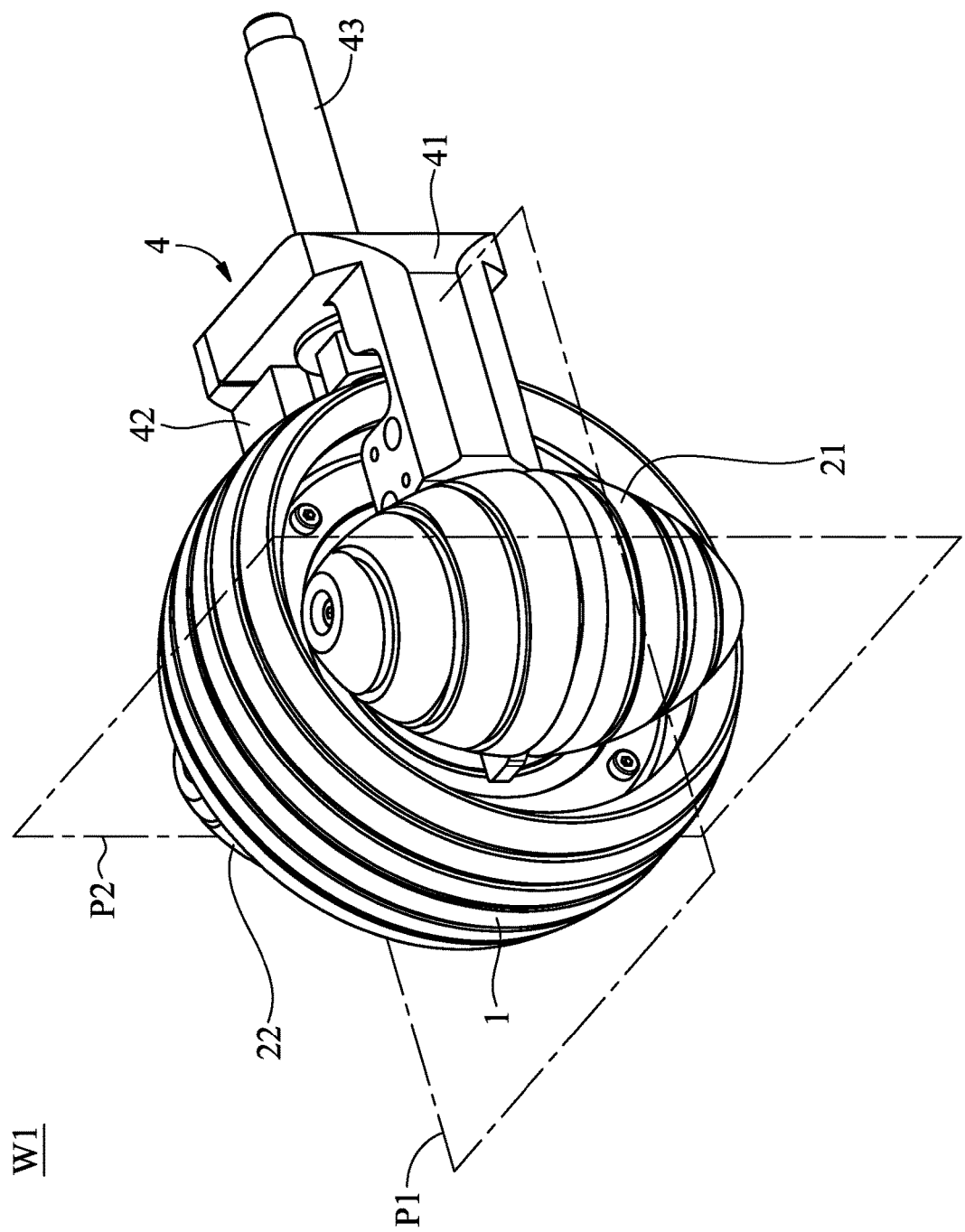
FIG. 1 is an assembled view of an omnidirectional wheel of the embodiment of the invention.

FIG. 1 is an assembled view of an omnidirectional wheel of the embodiment of the invention. With reference to FIG. 1, in this embodiment, the omnidirectional wheel W1 comprises a support unit 3 (not shown), a major wheel 1, a first minor wheel 21 and a second minor wheel 22. The major wheel 1 is annular and is rotatably disposed on the support unit 3 (not shown). The first minor wheel 21 is rotatably disposed on the support unit 3 (not shown). The first minor wheel 21 is disposed on one side of the major wheel 1. The second minor wheel 22 is rotatably disposed on the support unit 3 (not shown). The second minor wheel 22 is disposed on the other side of the major wheel 1.

With reference to FIG. 1, in one embodiment, the first minor wheel 21 and the second minor wheel 22 are ellipsoid-shaped.

Figure 2A:
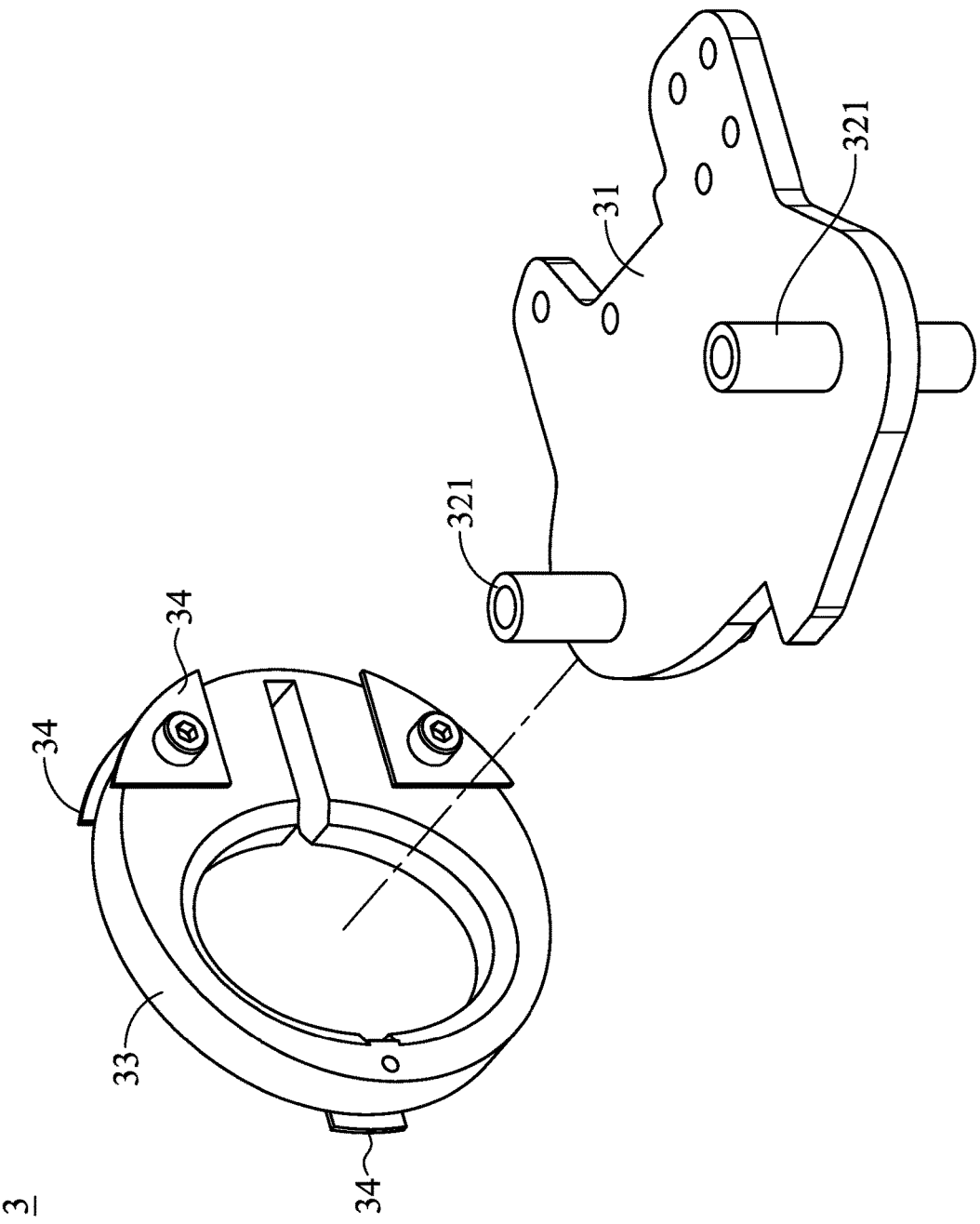
FIG. 2A is an exploded view of a support unit of the embodiment of the invention.
Figure 2B:
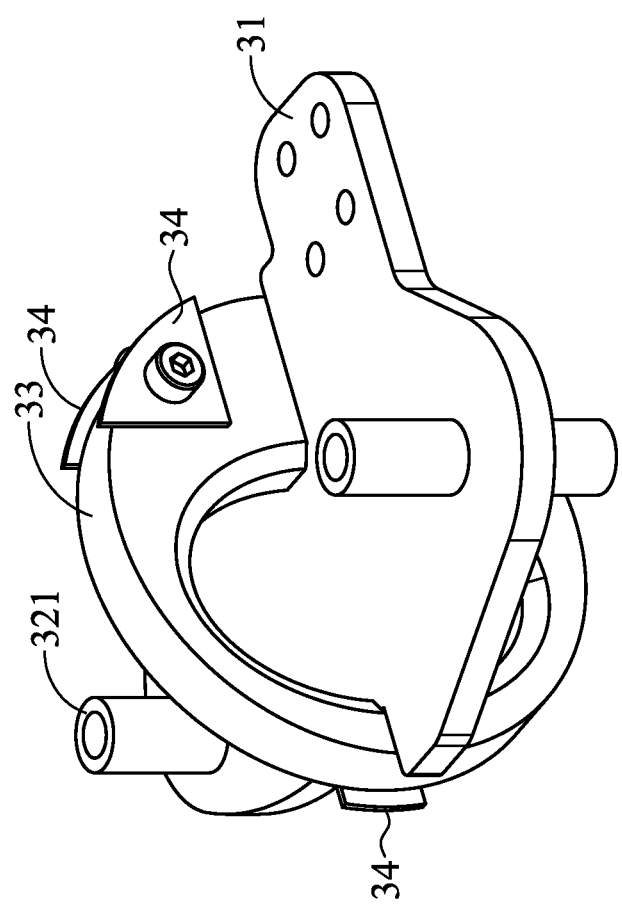
FIG. 2B is an assembled view of the support unit of the embodiment of the invention.
Figure 2C:
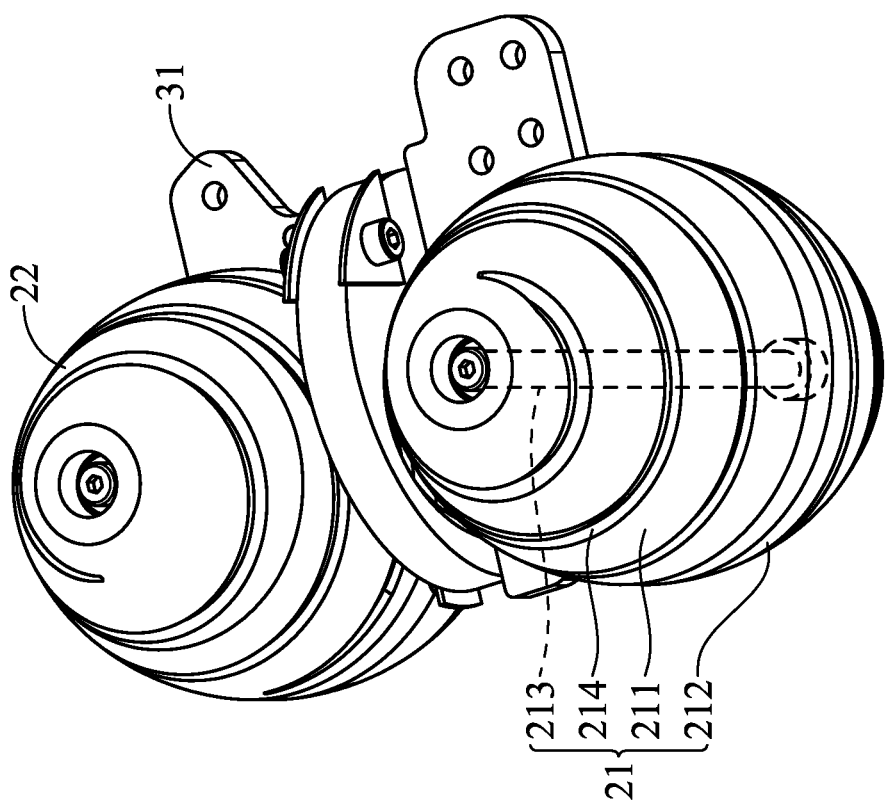
FIG. 2C shows the first minor wheel combined with the second minor wheel.

FIG. 2A is an exploded view of a support unit of the embodiment of the invention. FIG. 2B is an assembled view of the support unit of the embodiment of the invention. FIG. 2C shows the first minor wheel combined with the second minor wheel. With reference to FIGS. 2A, 2B and 2C, in one embodiment, the support unit 3 comprises a supporting base plate 31. The first minor wheel 21 comprises a first shaft 213, a first minor wheel section 211 and a second minor wheel section 212. The first minor wheel section 211 and the second minor wheel section 212 are rotatably disposed on two sides (upper side and lower side) of the supporting base plate 31 via the first shaft 213. In this embodiment, the support unit 3 further comprises a bushing 321. The first shaft 213 is rotatably connected to the support unit 3 via the bushing 321.

With reference to FIG. 2C, in one embodiment, the first minor wheel 21 comprises a minor wheel tread 214. The minor wheel tread 214 extends in a spiral path around the first shaft 213. In another embodiment, the wheel tread can also be longitudinal or annular. The disclosure is not meant to restrict the invention.

Figure 3A:
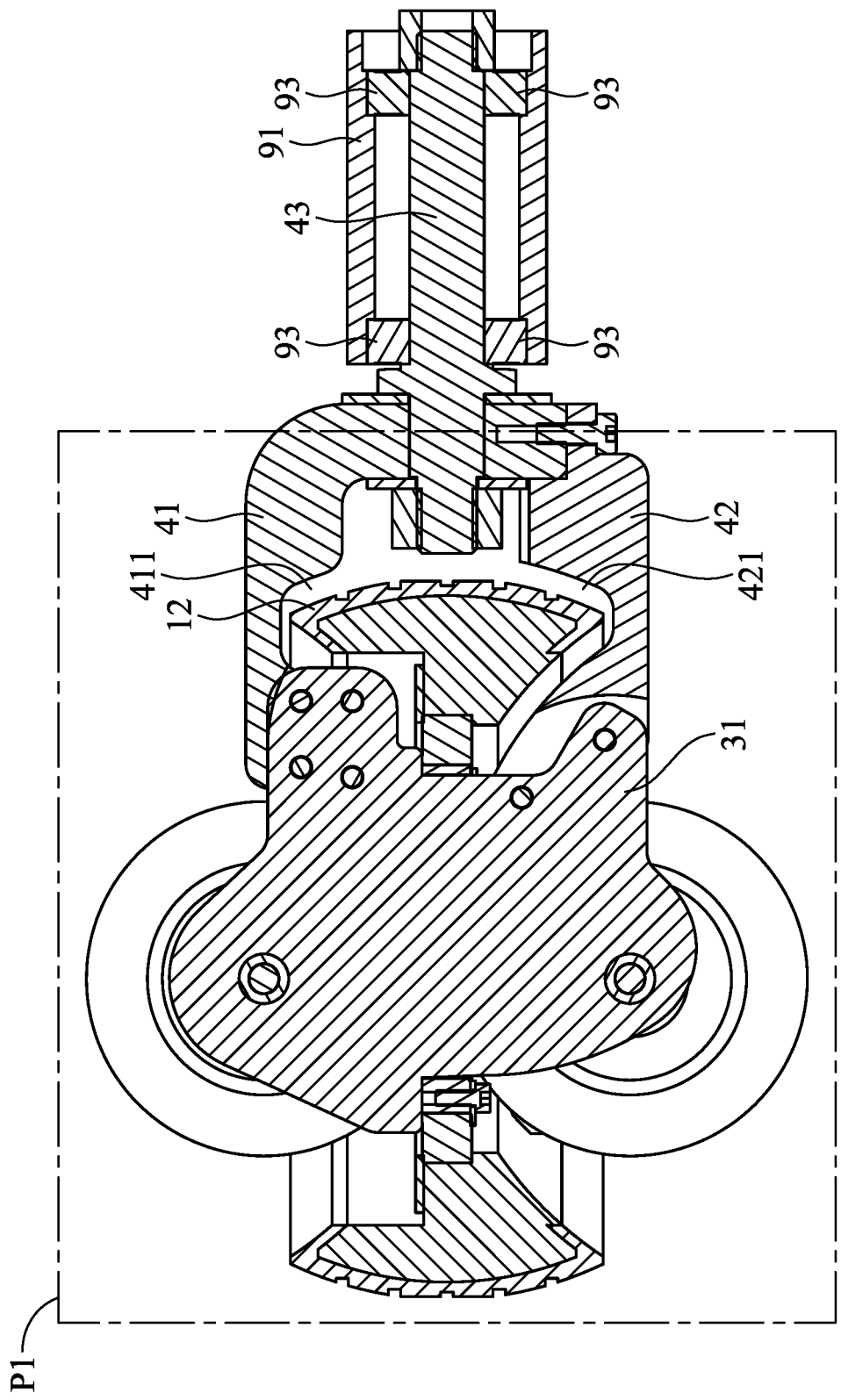
FIG. 3A is a cross-sectional view of the omnidirectional wheel of the embodiment of the invention on a first plane.
Figure 3B:
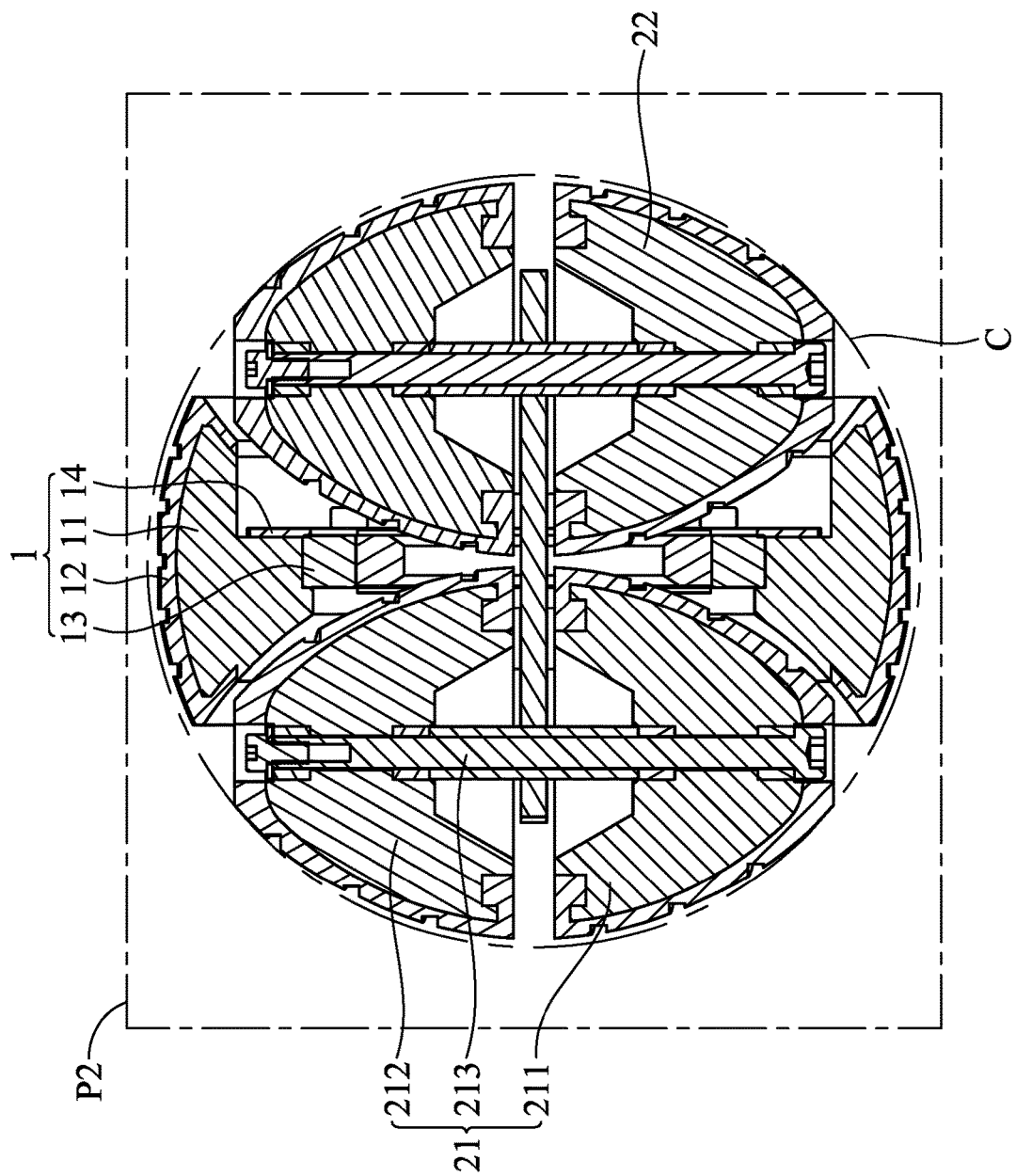
FIG. 3B is a cross-sectional view of the omnidirectional wheel of the embodiment of the invention on a second plane.

FIG. 3A is a cross-sectional view of the omnidirectional wheel of the embodiment of the invention on a first plane. FIG. 3B is a cross-sectional view of the omnidirectional wheel of the embodiment of the invention on a second plane. With reference to FIGS. 1, 3A and 3B, in one embodiment, the supporting base plate 31 is on a first plane P1. The second plane P2 is orthogonal to the first plane P1. The axis of the first shaft 213 extends to the second plane P2. On the second plane P2, a profile C formed by cross sections of the major wheel 1, the first minor wheel 21 and the second minor wheel 22 is circular, or substantially circular. Therefore, when the omnidirectional wheel W1 rolls laterally (in a sideways direction). The major wheel 1, the first minor wheel 21 and the second minor wheel 22 compose a wheel with a greater rotation diameter (similar to a rotation diameter of the major wheel 1 when the major wheel 1 rolls forward). Therefore, the omnidirectional wheel W1 can easily roll over an obstacle when the omnidirectional wheel W1 rolls laterally.

Additionally, since the minor wheel treads of the first minor wheel 21 and the second minor wheel 22 extends in the spiral paths, the omnidirectional wheel W1 tends to rolls with the major wheel 1 when the omnidirectional wheel W1 rolls forward (when the first minor wheel 21 or the second minor wheel 22 contacts the ground, the omnidirectional wheel W1 tends to rotate to roll with the major wheel 1). Therefore, the omnidirectional wheel W1 can easily roll over an obstacle when the omnidirectional wheel W1 rolls forward.

With reference to FIGS. 1 and 3B, in one embodiment, a rotational axis of the major wheel 1 passes through the second plane P2. The rotational axis of the first minor wheel 21 (that is, the axis of the first shaft 213), and the rotational axis of the second minor wheel 22 extend on the second plane P2. The rotational axis of the major wheel 1 is perpendicular to the rotational axis of the first minor wheel 21. The rotational axis of the major wheel 1 is also perpendicular to the rotational axis of the second minor wheel 22.

Figure 4A:
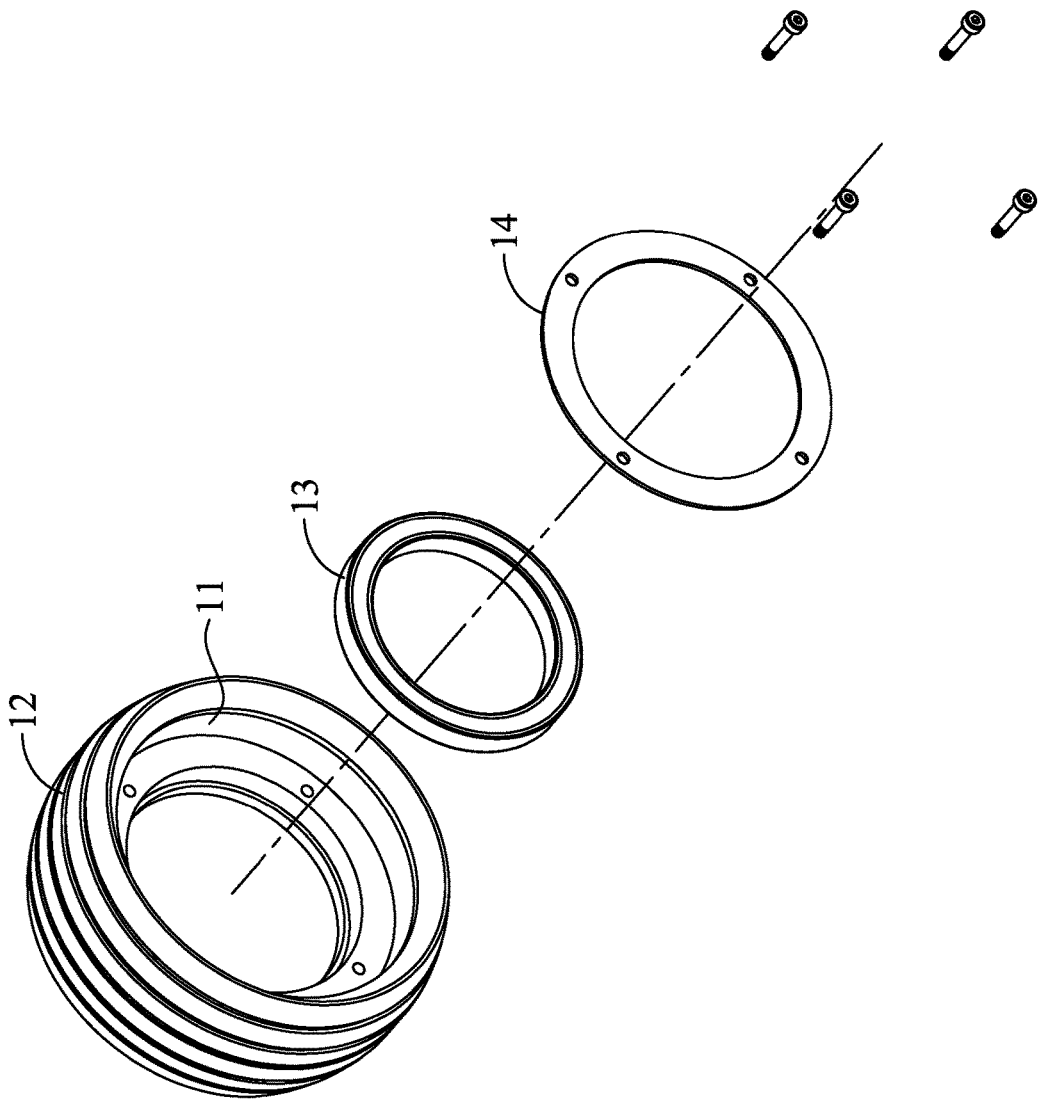
FIG. 4A is an exploded view of the major wheel of the embodiment of the invention.
Figure 4B:
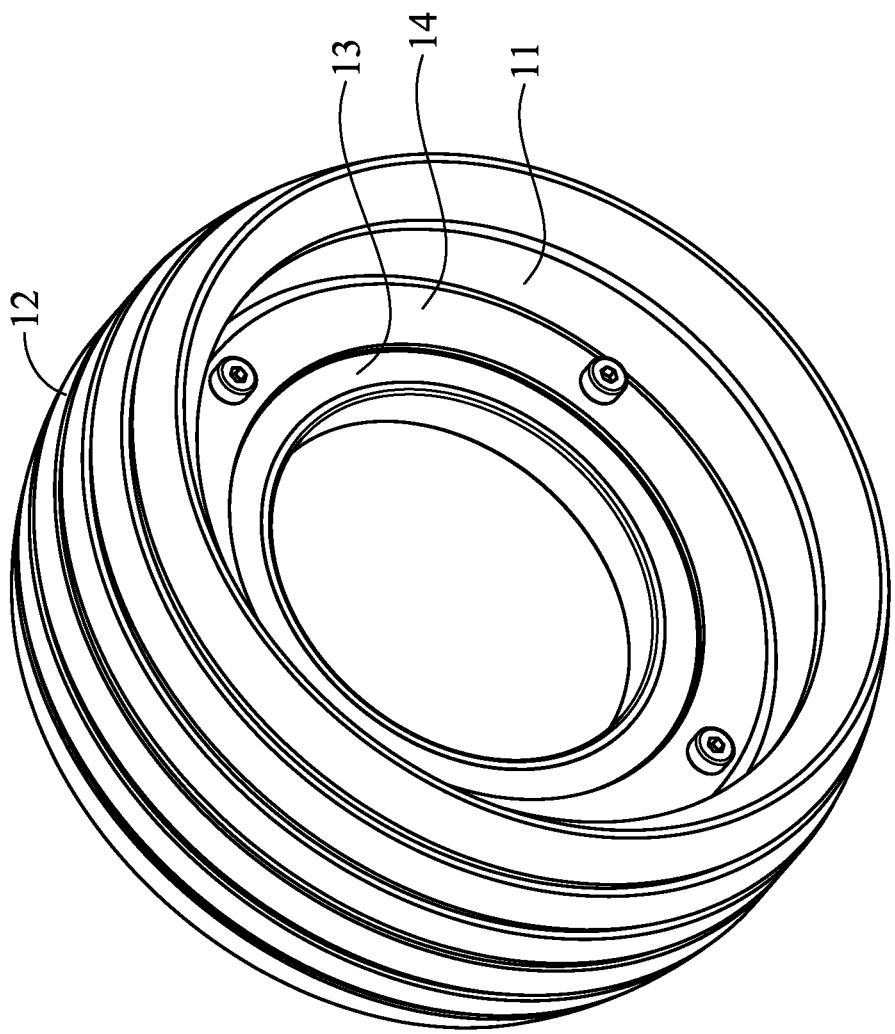
FIG. 4B is an assembled view of the major wheel of the embodiment of the invention.

FIG. 4A is an exploded view of the major wheel of the embodiment of the invention. FIG. 4B is an assembled view of the major wheel of the embodiment of the invention. With reference to FIGS. 4A and 4B, in one embodiment, the major wheel 1 comprises a hub 11, a tire layer 12, a bearing 13 and an annular restriction plate 14. The tire layer 12 surrounds the hub 11. The annular restriction plate 14 is affixed to the hub 11.

The bearing 13 is sandwiched between the annular restriction plate 14 and the hub 11. In one embodiment, the annular restriction plate 14 can be replaced by bolts, wherein the head of the bolt can restrict the bearing 13.

With reference to FIGS. 2A, 2B, 3B and 4B, in one embodiment, the support unit 3 comprises a bearing bracket 33. The bearing 13 is telescoped on the bearing bracket 33. The bearing bracket 33 is wedged into the supporting base plate 31.

Figure 5:
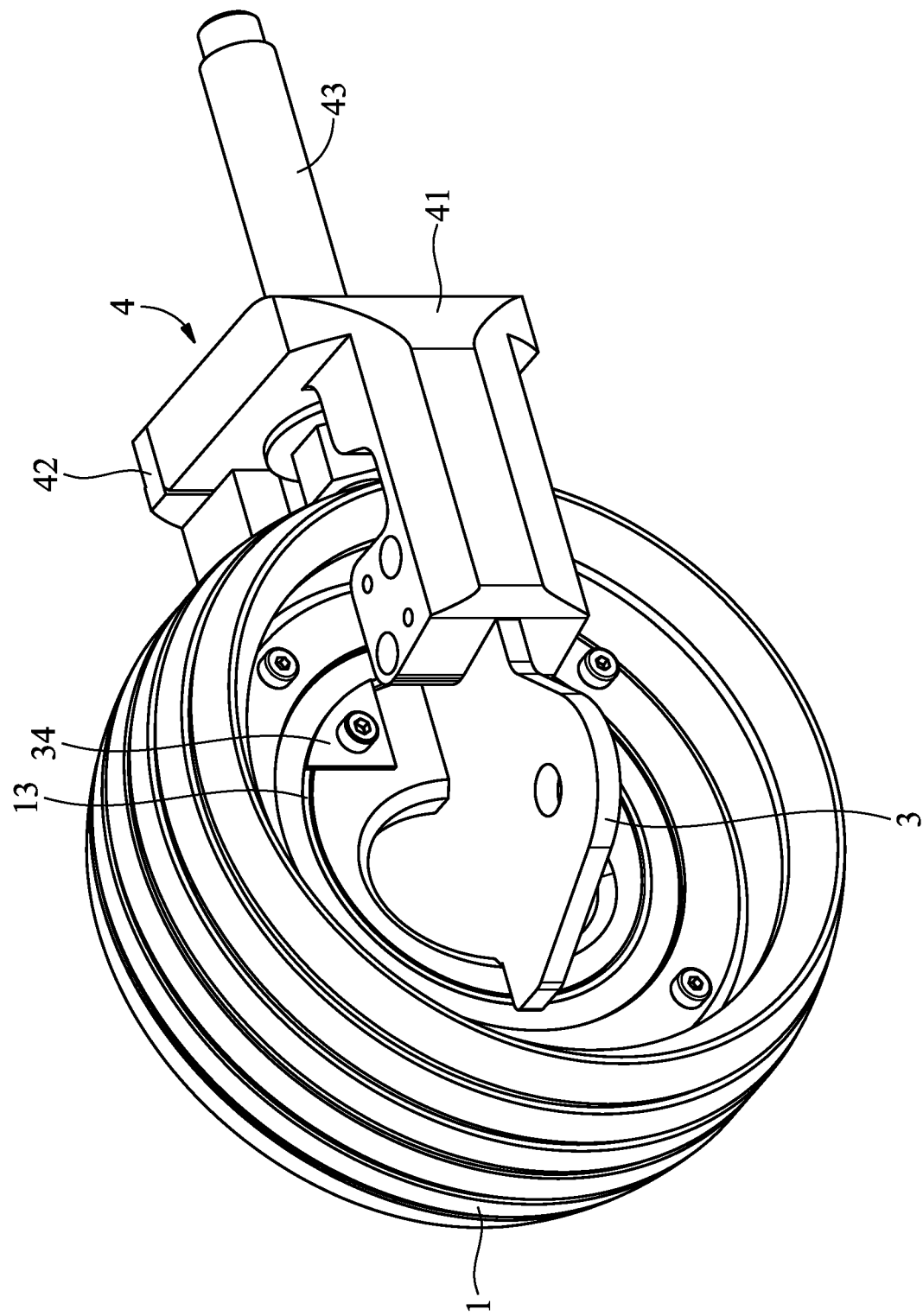
FIG. 5 shows the relationship between the auxiliary restriction plates and the bearing.

FIG. 5 shows the relationship between the auxiliary restriction plates and the bearing. With reference to FIGS. 2A, 2B and 5, in one embodiment, the support unit 3 further comprises a plurality of auxiliary restriction plates 34. The auxiliary restriction plates 34 are affixed to the bearing bracket 33. The auxiliary restriction plates 34 restrict the bearing 13 to prevent the bearing 13 from separated from the bearing bracket 33. To clearly present the position of the auxiliary restriction plates 34, in FIGS. 2A, 2B and 5, the auxiliary restriction plates 34 are directly connected to the bearing bracket 33. However, in the assembling process of the embodiment of the invention, the bearing bracket 33 can be combined to the supporting base plate 31 first; next, the major wheel is combined to the bearing bracket 33; then, the auxiliary restriction plates 34 are affixed to the bearing bracket 33. The disclosure is not meant to restrict the invention. In other embodiment, the auxiliary restriction plates 34 can be replaced by bolts, wherein the head of the bolt can restrict the bearing 13.

Figure 6A:
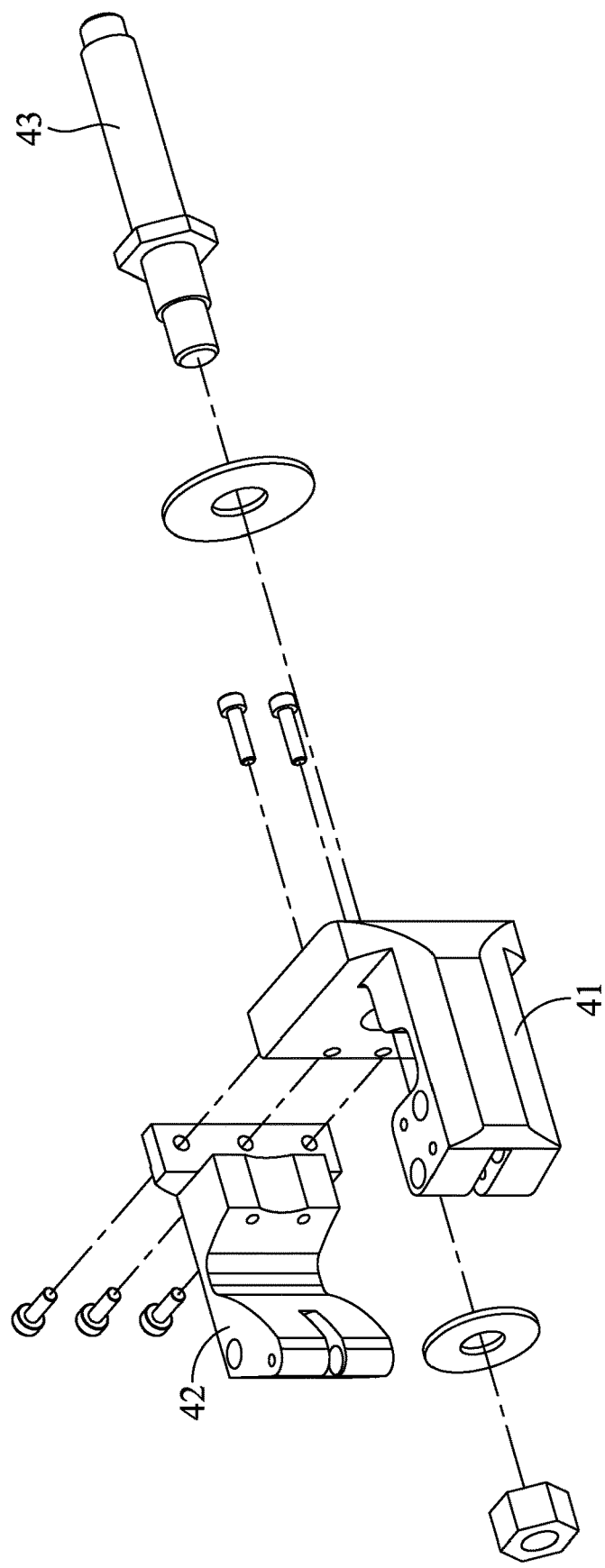
FIG. 6A is an exploded view of the rotational bracket of the embodiment of the invention.
Figure 6B:
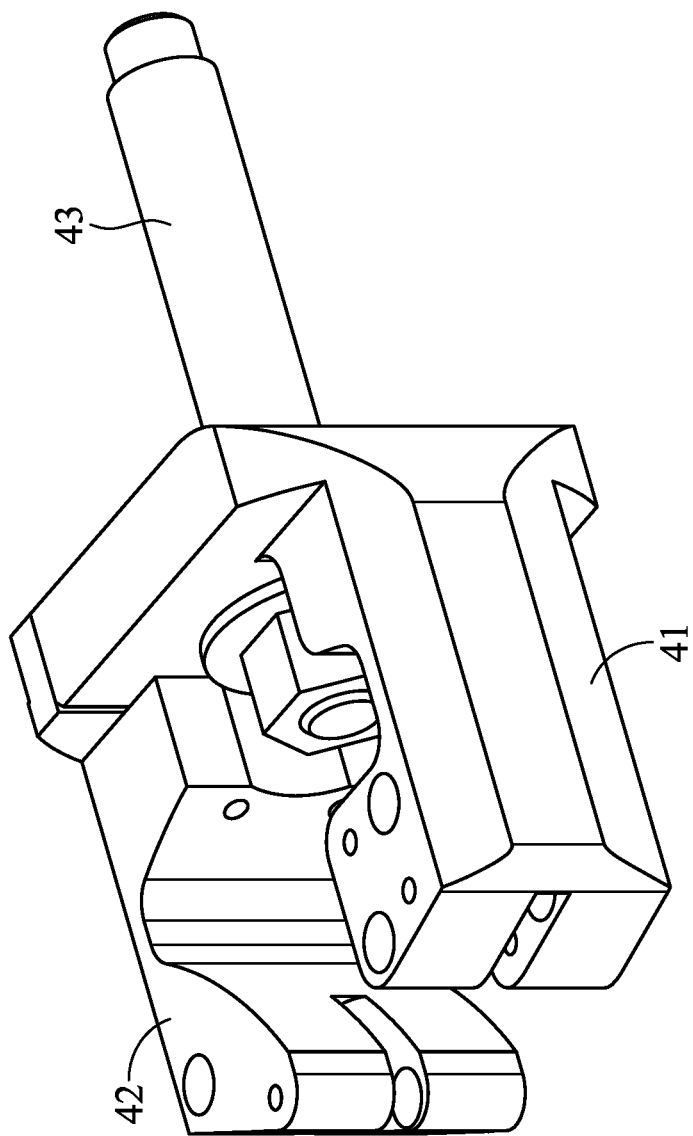
FIG. 6B is an assembled view of the rotational bracket of the embodiment of the invention.

FIG. 6A is an exploded view of the rotational bracket of the embodiment of the invention. FIG. 6B is an assembled view of the rotational bracket of the embodiment of the invention. With reference to FIGS. 1, 6A and 6B, in one embodiment, the omnidirectional wheel W1 further comprises a rotational bracket 4. The rotational bracket 4 comprises a first arm 41, a second arm 42 and a connection shaft 43. The first arm 41 is affixed to the second arm 42. The first arm 41 and the second arm 42 are rotatably connected to the connection shaft 43. With reference to FIG. 3A, the supporting base plate 31 is affixed to the first arm 41 and the second arm 42. In another embodiment, the first arm 41 and the second arm 42 can be fastened to the connection shaft 43. The disclosure is not meant to restrict the invention.

With reference to FIG. 3A, in one embodiment, the first arm 41 comprises a first notch 411. The second arm 42 comprises a second notch 421. The hub 11 and the tire layer 12 are located in the first notch 411 and the second notch 421.

With reference to FIG. 5, in one embodiment, the first arm 41 covers at least a portion of the bearing 13. Therefore, the first arm 41 restricts the bearing 13.

Figure 7:
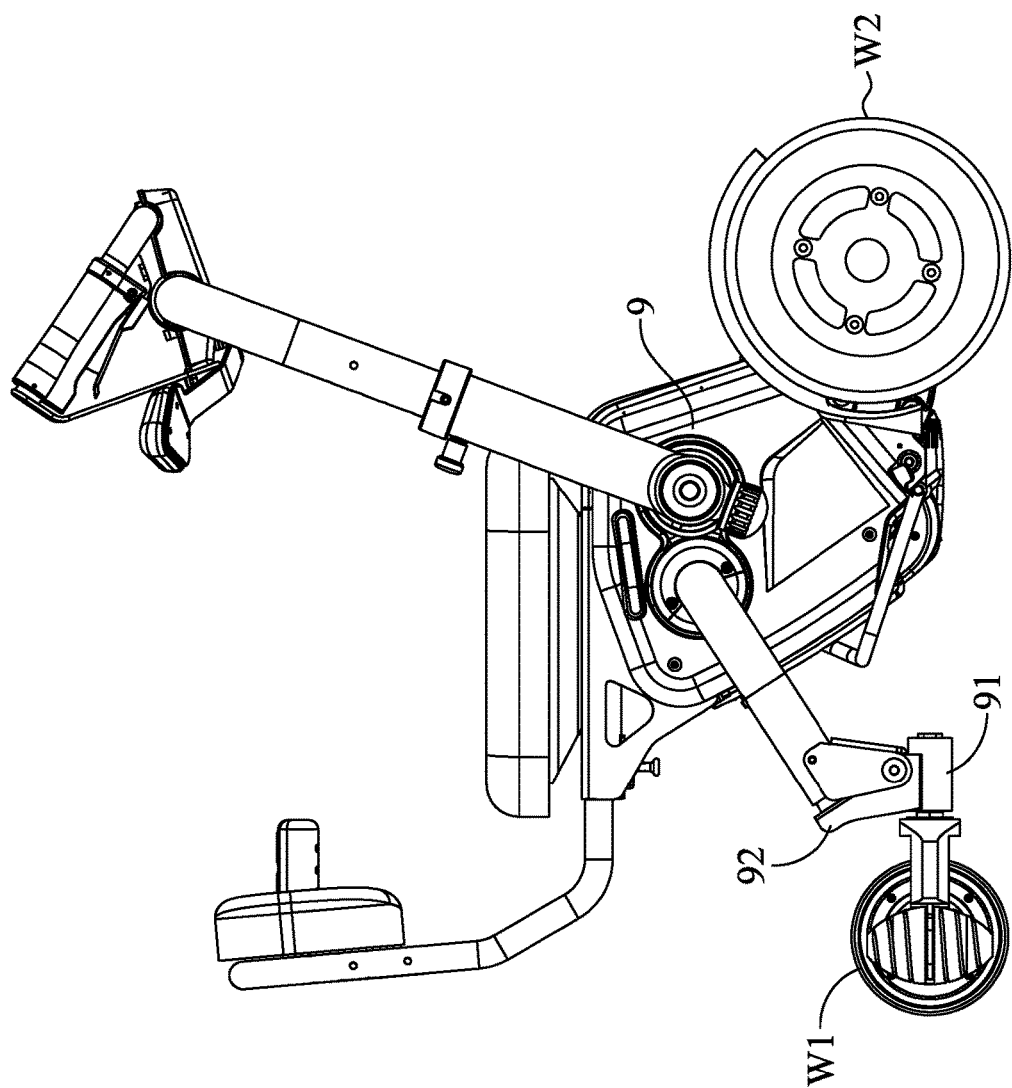
FIG. 7 shows a walker of the embodiment of the invention.

With reference to FIG. 7, in one embodiment, a walker WA of the embodiment of the invention is provided. The walker WA includes a walker body 9, a front wheel W2 and said omnidirectional wheel W1. The front wheel W2 is rotatably connected to a front part of the walker body 9. The omnidirectional wheel W1 is rotatably connected to a rear part of the walker body 9. In another embodiment, the omnidirectional wheel W1 can be rotatably connected to a front part of the walker body 9. The disclosure is not meant to restrict the invention.

With reference to FIGS. 3A and 7, in one embodiment, the walker further comprises a connection cylinder 91 and a connection bracket 92. The connection bracket 92 is affixed to the connection cylinder 91. The connection bracket 92 is connected to the walker body 9, and the connection shaft 43 is connected to the connection cylinder 91. In one embodiment, the rotational bracket 4 can rotates around the connection cylinder 91 for 360 degrees. A bearing 93 can be disposed between the connection cylinder 91 and the connection shaft 43 (with reference to FIG. 3A).

Figure 8:
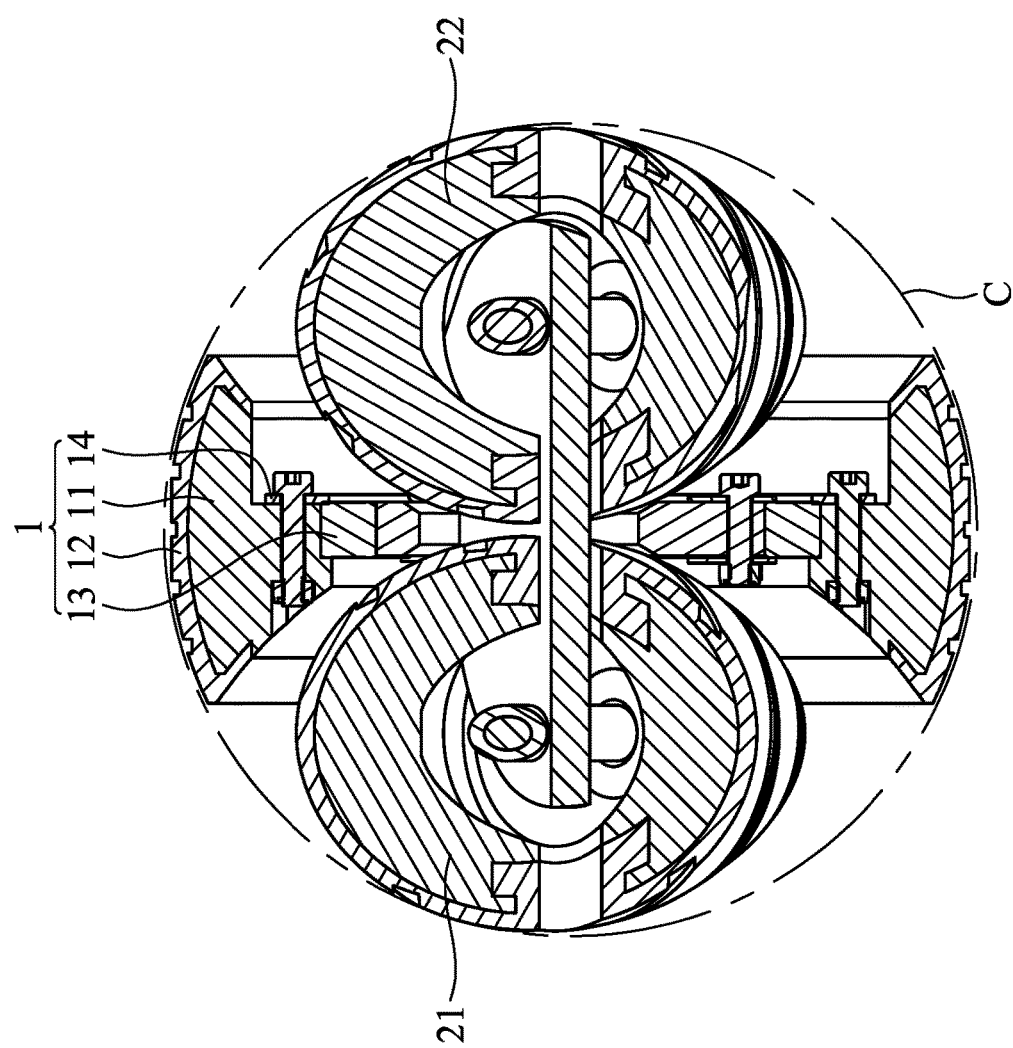
FIG. 8 shows the profile of the cross section of the omnidirectional wheel of the embodiment of the invention, wherein the omnidirectional wheel is inclined.

With reference to FIG. 7, in one embodiment, the connection bracket 92 is adapted to be rotated relative to the walker body 9, and in the rotation, the omnidirectional wheel W1 can contact the ground in different inclined angles. With reference to FIG. 8, wherein the omnidirectional wheel W1 is inclined, the profile C of the cross section of the omnidirectional wheel W1 is still circular, or substantially circular. The omnidirectional wheel W1 therefore can roll smoothly.

In the omnidirectional wheel of the embodiment of the invention, the first minor wheel and the second minor wheel are disposed on two sides of the major wheel, and the first minor wheel and the second minor wheel are ellipsoid-shaped. Therefore, when the omnidirectional wheel rolls laterally, the profile (contacting the ground) formed by cross sections of the major wheel, the first minor wheel and the second minor wheel is circular, or substantially circular. The omnidirectional wheel therefore can roll smoothly. In the embodiment of the invention, the rotational diameter of the omnidirectional wheel in lateral rolling is substantially the same with the rotational diameter of the omnidirectional wheel in forward rolling. In other words, the omnidirectional wheel W1 can easily roll over an obstacle when the omnidirectional wheel W1 rolls laterally or forward, which is adapted to roll on bumpy roads.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An omnidirectional wheel, comprising:
   a support unit;
   a major wheel, wherein the major wheel is annular and is rotatably disposed on the support unit;
   a first minor wheel, rotatably disposed on the support unit, wherein the first minor wheel is disposed on one side of the major wheel; and
   a second minor wheel, rotatably disposed on the support unit, wherein the second minor wheel is disposed on the other side of the major wheel,
   wherein the support unit comprises a supporting base plate, and the first minor wheel comprises a first shaft, a first minor wheel section and a second minor wheel section, wherein the first minor wheel section and the second minor wheel section are rotatably disposed on two opposite sides of the supporting base plate via the first shaft, and the first minor wheel section is separated from the second minor section.

2. The omnidirectional wheel as claimed in claim 1, wherein the first minor wheel and the second minor wheel are ellipsoid-shaped.

3. The omnidirectional wheel as claimed in claim 2, wherein the first minor wheel comprises a minor wheel tread, and the minor wheel tread extends in a spiral path around the first shaft.

4. The omnidirectional wheel as claimed in claim 2, wherein the supporting base plate is on a first plane, a second plane is orthogonal to the first plane, an axis of the first shaft extends to the second plane, wherein on the second plane, a circular profile is formed by cross sections of the major wheel, the first minor wheel, and the second minor wheel.

5. The omnidirectional wheel as claimed in claim 2, wherein the major wheel comprises a hub, a tire layer, a bearing, and an annular restriction plate, the tire layer surrounds the hub, and the annular restriction plate is affixed to the hub, and the bearing is sandwiched between the annular restriction plate and the hub.

6. The omnidirectional wheel as claimed in claim 5, wherein the support unit comprises a bearing bracket, the bearing is telescoped on the bearing bracket, and the bearing bracket is wedged into the supporting base plate.

7. The omnidirectional wheel as claimed in claim 6, wherein the support unit further comprises a plurality of auxiliary restriction plates, the auxiliary restriction plates are affixed to the bearing bracket, and the auxiliary restriction plates restrict the bearing.

8. The omnidirectional wheel as claimed in claim 7, further comprising a rotational bracket, wherein the rotational bracket comprises a first arm, a second arm and a connection shaft, the first arm is affixed to the second arm, the first arm and the second arm are rotatably connected to the connection shaft, and the supporting base plate is affixed to the first arm and the second arm.

9. The omnidirectional wheel as claimed in claim 8, wherein the first arm comprises a first notch, the second arm comprises a second notch, and the hub and the tire layer are located in the first notch and the second notch.

10. The omnidirectional wheel as claimed in claim 8, wherein the first arm covers at least a portion of the bearing.

11. A walker, comprising:
a walker body;
a front wheel, rotatably connected to a front part of the walker body; and
an omnidirectional wheel, rotatably connected to a rear part of the walker body, wherein the omnidirectional wheel comprises:
a support unit;
a major wheel, wherein the major wheel is annular and is rotatably disposed on the support unit;
a first minor wheel, rotatably disposed on the support unit, wherein the first minor wheel is disposed on one side of the major wheel; and
a second minor wheel, rotatably disposed on the support unit, wherein the second minor wheel is disposed on the other side of the major wheel;
wherein the support unit comprises a supporting base plate, and the first minor wheel comprises a first shaft, a first minor wheel section and a second minor wheel section, wherein the first minor wheel section and the second minor wheel section are rotatably disposed on two opposite sides of the supporting base plate via the first shaft, and the first minor wheel section is separated from the second minor section.

12. The walker as claimed in claim 11, wherein the first minor wheel and the second minor wheel are ellipsoid-shaped.

13. The walker as claimed in claim 12, wherein the major wheel comprises a hub, a tire layer, a bearing and an annular restriction plate, the tire layer surrounds the hub, and the annular restriction plate is affixed to the hub to sandwich the bearing between the annular restriction plate and the hub.

14. The walker as claimed in claim 13, wherein the support unit comprises a bearing bracket, the bearing is telescoped on the bearing bracket, and the bearing bracket is wedged into the supporting base plate.

15. The walker as claimed in claim 14, wherein the support unit further comprises a plurality of auxiliary restriction plates, the auxiliary restriction plates are affixed to the bearing bracket, and the auxiliary restriction plates restrict the bearing.

16. The walker as claimed in claim 15, wherein the omnidirectional wheel further comprises a rotational bracket, the rotational bracket comprises a first arm, a second arm and a connection shaft, the first arm is affixed to the second arm, the first arm and the second arm are rotatably connected to the connection shaft, and the supporting base plate is affixed to the first arm and the second arm.

17. The walker as claimed in claim 16, wherein the first arm comprises a first notch, the second arm comprises a second notch, and the hub and the tire layer are located in the first notch and the second notch.

18. The walker as claimed in claim 16, wherein the first arm covers at least a portion of the bearing.

19. The walker as claimed in claim 16, further comprising a connection cylinder and a connection bracket, wherein the connection bracket is affixed to the connection cylinder, the connection bracket is connected to the walker body, and the connection shaft is connected to the connection cylinder.

* * * * *